United States Patent
Liu

(10) Patent No.: US 9,689,639 B1
(45) Date of Patent: Jun. 27, 2017

(54) CONNECTION DEVICE FOR CONNECTING LIMB TO BARREL OF CROSSBOW

(71) Applicant: POE LANG ENTERPRISE CO., LTD., Taichung (TW)

(72) Inventor: Chi-Chang Liu, Taichung (TW)

(73) Assignee: Poe Lang Enterprise Co., Ltd., Taichung (TW)

( * ) Notice: Subject to any disclaimer, the term of this patent is extended or adjusted under 35 U.S.C. 154(b) by 0 days.

(21) Appl. No.: 15/344,889

(22) Filed: Nov. 7, 2016

(51) Int. Cl.
    *F41B 5/12* (2006.01)
    *F16B 17/00* (2006.01)
    *F16B 21/06* (2006.01)

(52) U.S. Cl.
    CPC ............... *F41B 5/12* (2013.01); *F16B 17/00* (2013.01); *F16B 21/06* (2013.01)

(58) Field of Classification Search
    CPC ........................................................ F41B 5/12
    See application file for complete search history.

(56) References Cited

U.S. PATENT DOCUMENTS

| | | | | |
|---|---|---|---|---|
| 4,002,236 A | * | 1/1977 | Tolleson .................. | F41B 5/12 124/25 |
| 5,522,373 A | * | 6/1996 | Barnett .................... | F41B 5/12 124/23.1 |
| 5,749,348 A | * | 5/1998 | Oviedo-Reyes ......... | F41B 5/12 124/25 |
| 8,225,777 B2 | * | 7/2012 | Chu ........................ | F41B 5/123 124/25 |
| 2014/0283805 A1 | * | 9/2014 | Dunlop .................... | F41B 5/12 124/25 |

* cited by examiner

*Primary Examiner* — John Ricci
(74) *Attorney, Agent, or Firm* — Rosenberg, Klein & Lee

(57) ABSTRACT

A crossbow includes a barrel, a fixing member and a limb. The barrel includes a recess defined between the first and second ends of the barrel. The fixing member is engaged with the recess. A pin extends through the barrel and the fixing member to restrict the fixing member from disengaging from the recess. The pin includes a head and a shank which has a groove, a first notch and a second notch. The groove is located between the first and second notches. A positioning unit positions the pin to the barrel. A string is connected between two ends of the limb. The fixing member is able to quickly engaged with or disengaged from the recess of the barrel to quickly assemble or dis-assemble the limb relative to the barrel.

9 Claims, 8 Drawing Sheets

CONNECTION DEVICE FOR CONNECTING LIMB TO BARREL OF CROSSBOW

BACKGROUND OF THE INVENTION

1. Fields of the Invention

The present invention relates to a crossbow, and more particularly, to a connection structure for connecting the limb to the barrel.

2. Descriptions of Related Art

The conventional crossbow generally includes a limb and a barrel which is usually fixed to the limb by bolts. The conventional crossbows are bulky and not suitable for transportation.

One of the conventional crossbows known to applicant discloses a limb and a barrel which has a recess and the limb is engaged with the recess of the barrel by fixing members. However, when assembling or dis-assembling the crossbow, the users have to remove the fixing members from the recess of the barrel, and then unscrewing the other bolts from the holes of the barrel such that the slide is able to be slid away to open the recess. The limb is then able to be inserted into the recess or removed from the recess. It is easier to assemble or dis-assemble the limb to the barrel when compared with the other conventional crossbows. The applicant wants to develop a connection structure for connecting the limb to the barrel, and the connection structure is easily operated.

The present invention intends to provide a connection structure for connecting the limb to the barrel quickly so as to improve the shortcomings mentioned above.

SUMMARY OF THE INVENTION

The present invention relates to a crossbow and comprises a barrel, a fixing member and a limb. The barrel has a first end and a second end, and a recess is defined in the barrel and located between the first and second ends. A receiving recess is defined in one inner end of the recess and located close to the first end of the barrel.

A fixing member has a reception hole defined in one side thereof. A protrusion protrudes from the fixing member and is received in the receiving recess. A fastener extends through the protrusion and contacts the limb against the inside of the reception hole such that the limb is connected to the reception hole of the fixing member. The fixing member is connected to the recess of the barrel. A pin extends through the barrel and the protrusion of the fixing member so as to restrict the fixing member from disengaging from the recess of the barrel. The pin has a head and a shank, wherein the shank has a groove, a first notch and a second notch defined in the outside thereof. The first and second notches are located on two ends of the groove. A positioning unit positions the pin to the barrel. A string is connected between the two ends of the limb.

The primary object of the present invention is to provide a crossbow wherein the limb is quickly assembled to or dis-assembled from the barrel by the connection structure.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
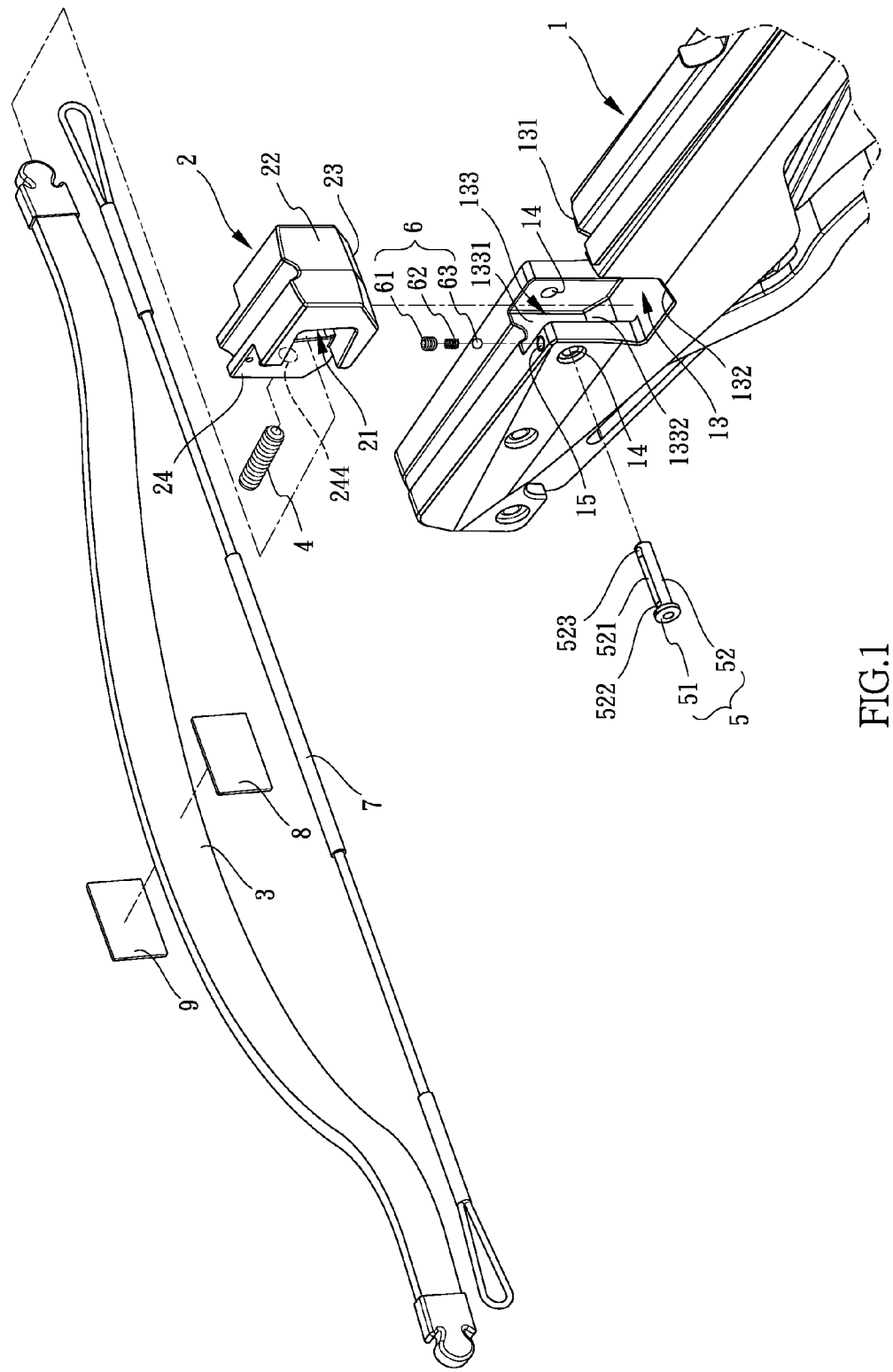
FIG. 1 is an exploded view to show the crossbow of the present invention.
Figure 2:
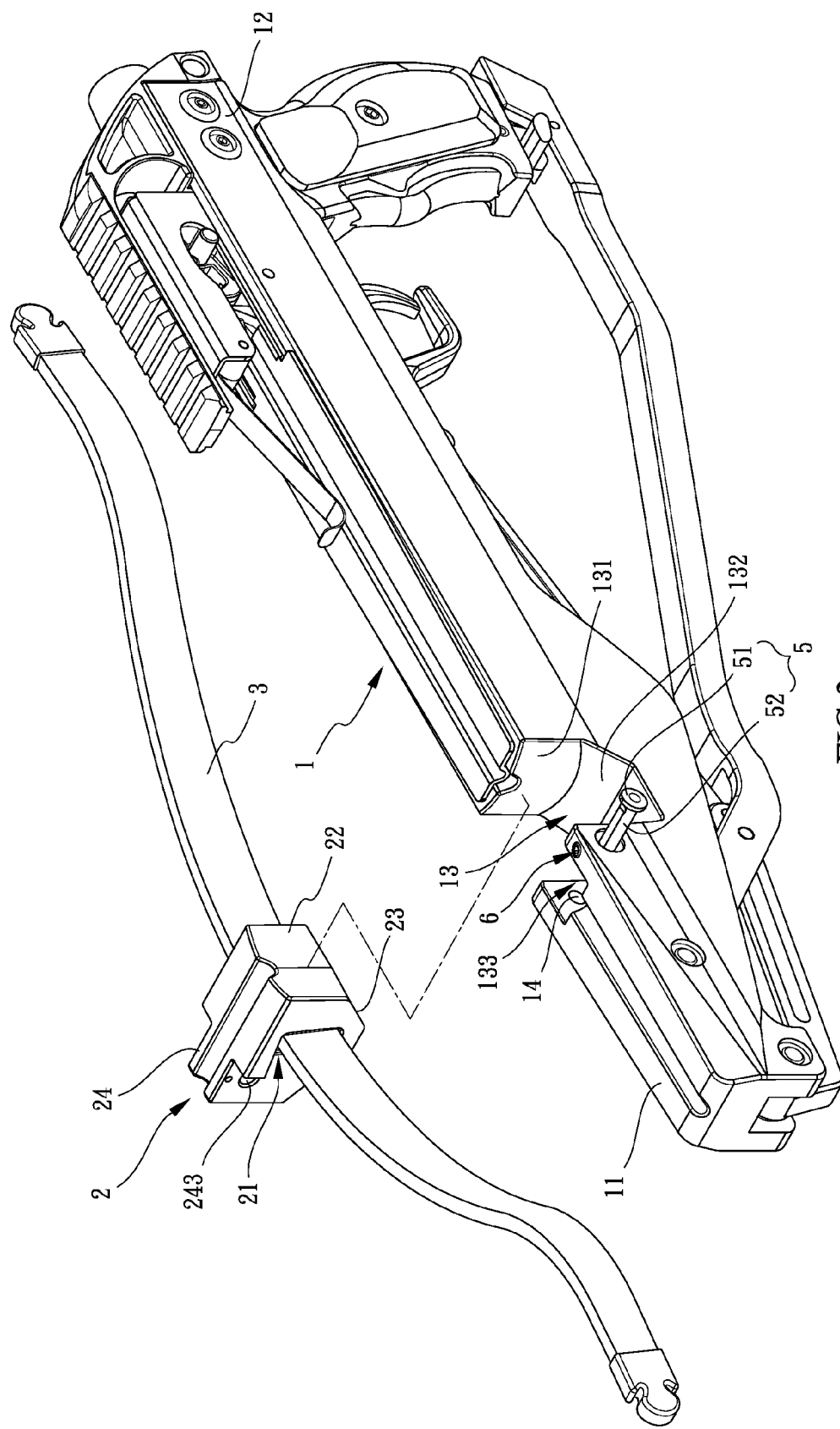
FIG. 2 shows that the fixing member and the limb are to be connected to the barrel.
Figure 3:
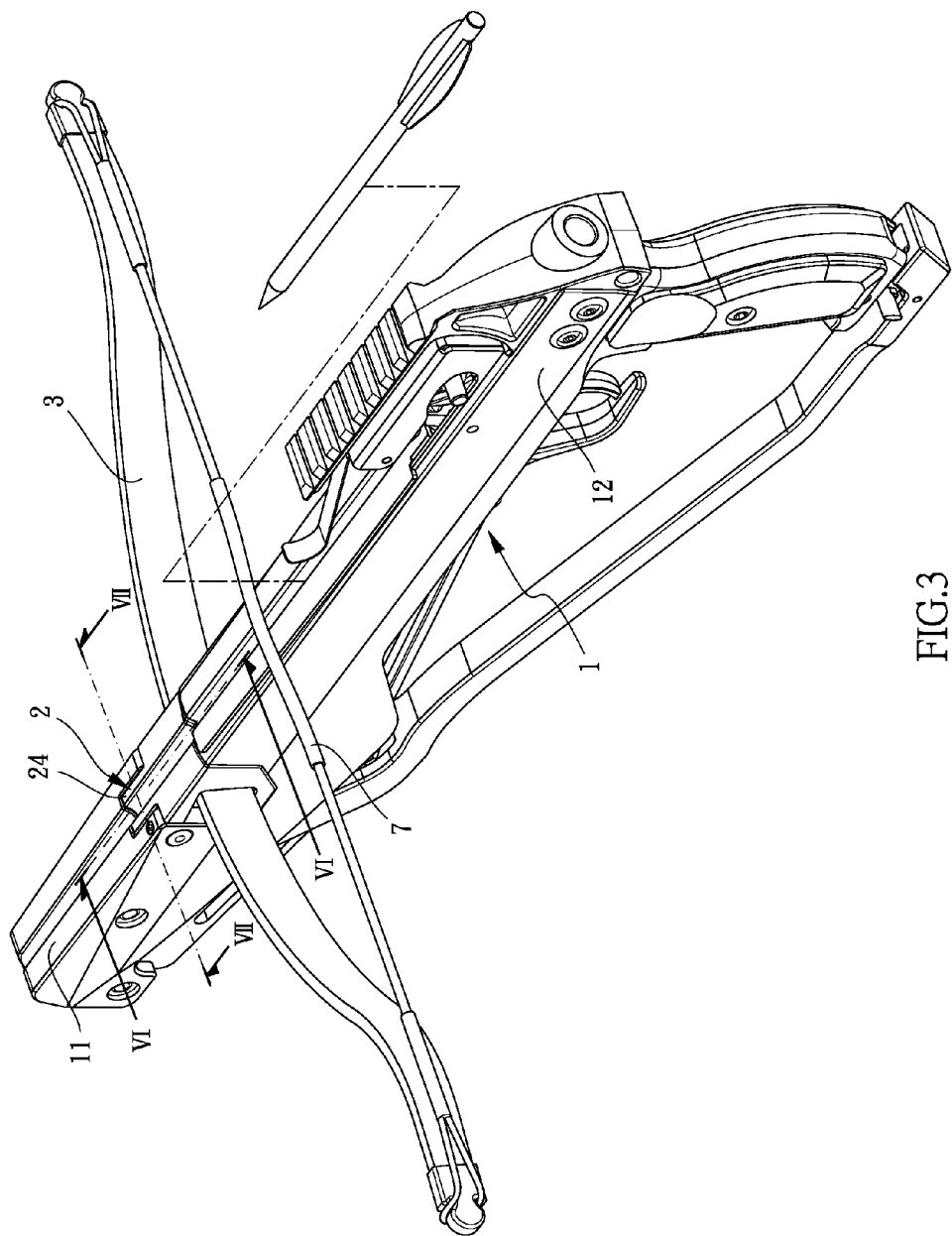
FIG. 3 is a perspective view to show the crossbow of the present invention.

Referring to FIGS. 1 to 9, the crossbow of the present invention comprises a barrel 1, a fixing member 2 and a limb 3.

The barrel 1 having a first end 11 and a second end 12. A recess 13 is defined in the barrel 1 and located between the first and second ends 11, 12. A receiving recess 133 is defined in one inner end of the recess 13 and located close to the first end 11 of the barrel 1.

The fixing member 2 has a reception hole 21 defined in one side thereof. A protrusion 24 protrudes from the fixing member 2 and is received in the receiving recess 133. A fastener 4 extends through the protrusion 24 and contacts the limb 3 against the inside of the reception hole 21 such that the limb 3 is connected to the reception hole 21 of the fixing member 2. When the fastener 4 is unscrewed, the limb 3 is released from the fastener 4 so that the limb 3 is easily removed. The fixing member 2 is connected to the recess 13 of the barrel 1. A pin 5 extends through the barrel 1 and the protrusion 24 of the fixing member 2 so as to restrict the fixing member 2 from disengaging from the recess 13 of the barrel 1. The pin 5 has a head 51 and a shank 52, wherein the shank 52 has a groove 521, a first notch 522 and a second notch 523 defined in the outside thereof. The first and second notches 522, 523 are located on two ends of the groove 521. A positioning unit 6 positions the pin 5 to the barrel 1. A string 7 is connected between the two ends of the limb 3.

When assembling, the fastener 4 secures the limb 3 to the reception hole 21 of the fixing member 2. The fixing member 2 is then connected to the recess 13 of the barrel 1. The pin 5 extends through the barrel 1 and the protrusion 24 of the fixing member 2. When dis-assembling, the user pushes the pin 5 to release fixing member 2 from the pin 5. The fixing member 2 is able to be removed from the recess 13 of the barrel 1. The steps for assembling and dis-assembling are simplified and easy. The disassembled crossbow occupies less space and easily to be transported. The limb 3 can be easily replaced by simply operating the fastener 4.

The receiving recess 133 is located between two sidewalls, and each sidewall has a first hole 14 defined therethrough. A positioning hole 15 is defined in one of the sidewalls and communicates with the first hole 14 of the sidewall in which the positioning hole 15 is defined. The protrusion 24 has a second hole 243 and a passage 244, wherein the second hole 243 is located corresponding to the first hole 14, and the passage 244 communicates with the reception hole 21. The fixing member 2 is engaged with the recess 13 of the barrel 1. The pin 5 extends through the first hole 14 and the second hole 243 to restrict the fixing member 2 from disengaging from the recess 13 of the barrel 1. The positioning unit 6 is connected to the positioning hole 15 to fix the pin 5.

The positioning unit 6 includes a bolt 61, a resilient member 62 and a ball 63. The ball 63, the resilient member 62 and the bolt 61 are received in the positioning hole 15 in sequence. The bolt 61 is connected to the positioning hole 15 to restrict the resilient member 62 and the ball 63 from disengaging from the positioning hole 15. The resilient member 62 is biased between the ball 63 and the bolt 61 so that the ball 63 is biased to be engaged with one of the first notch 522 or the second notch 523.

Figure 7:
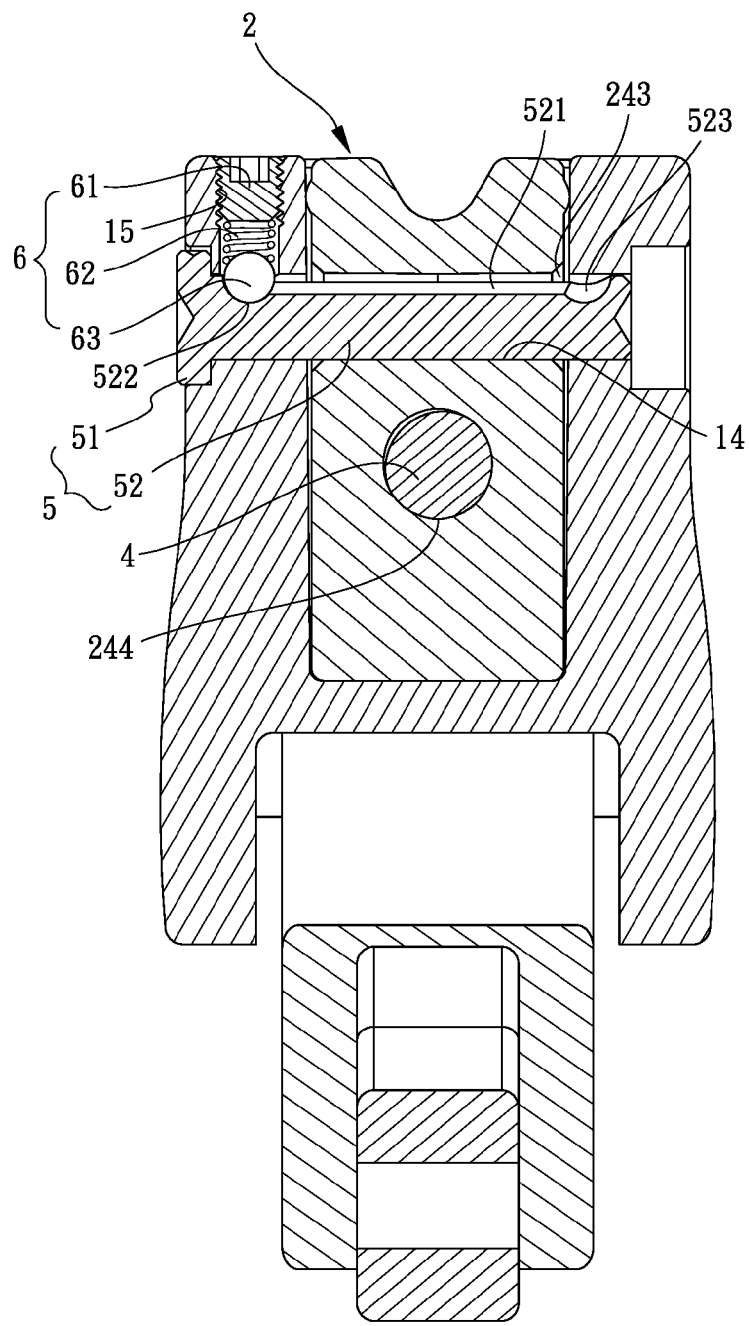
FIG. 7 is a cross sectional view, taken along line VIII-VIII in FIG. 3.
Figure 8:
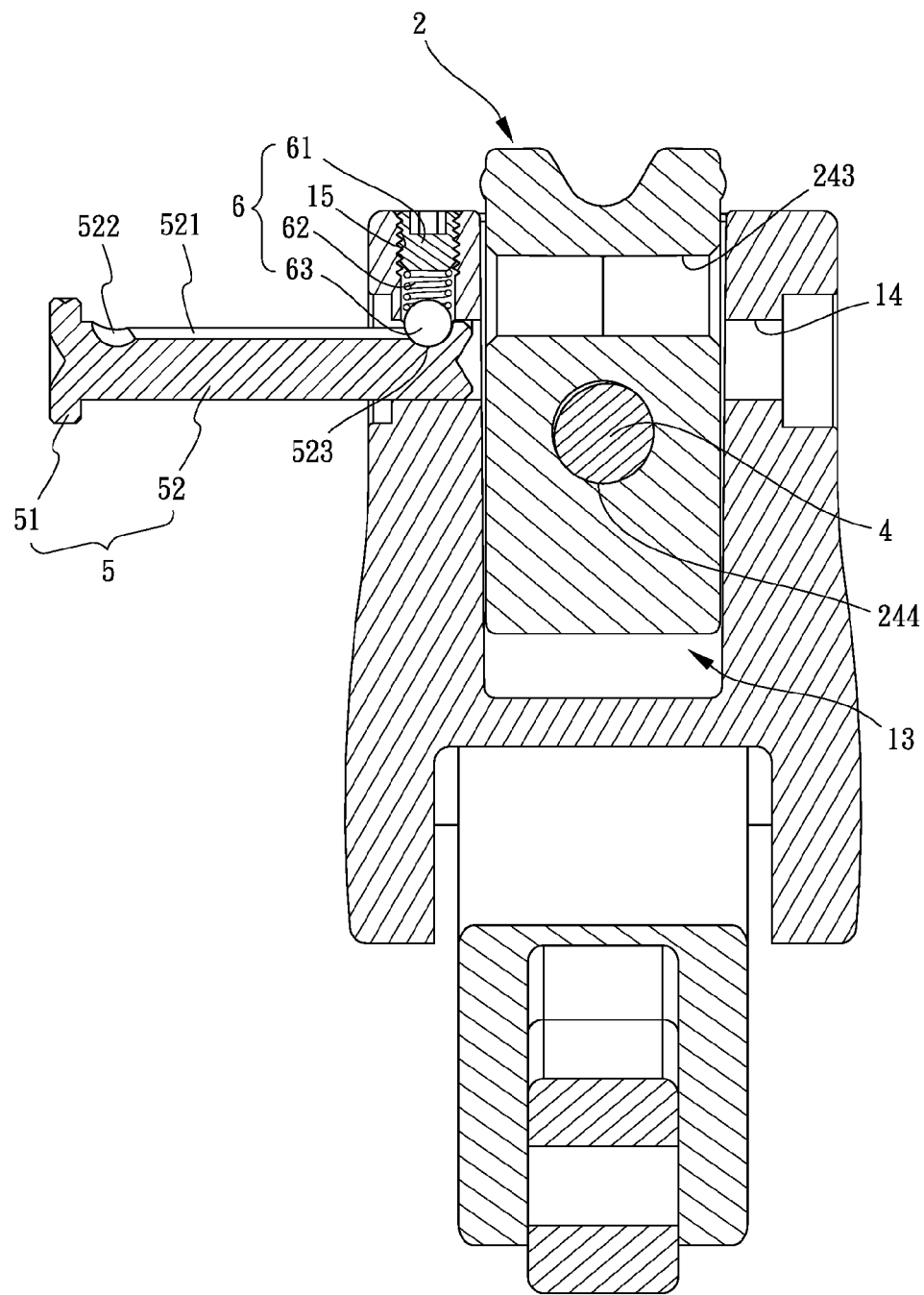
FIG. 8 is a cross sectional view to show that the pin in FIG. 5 is engaged with the second notch.
Figure 9:
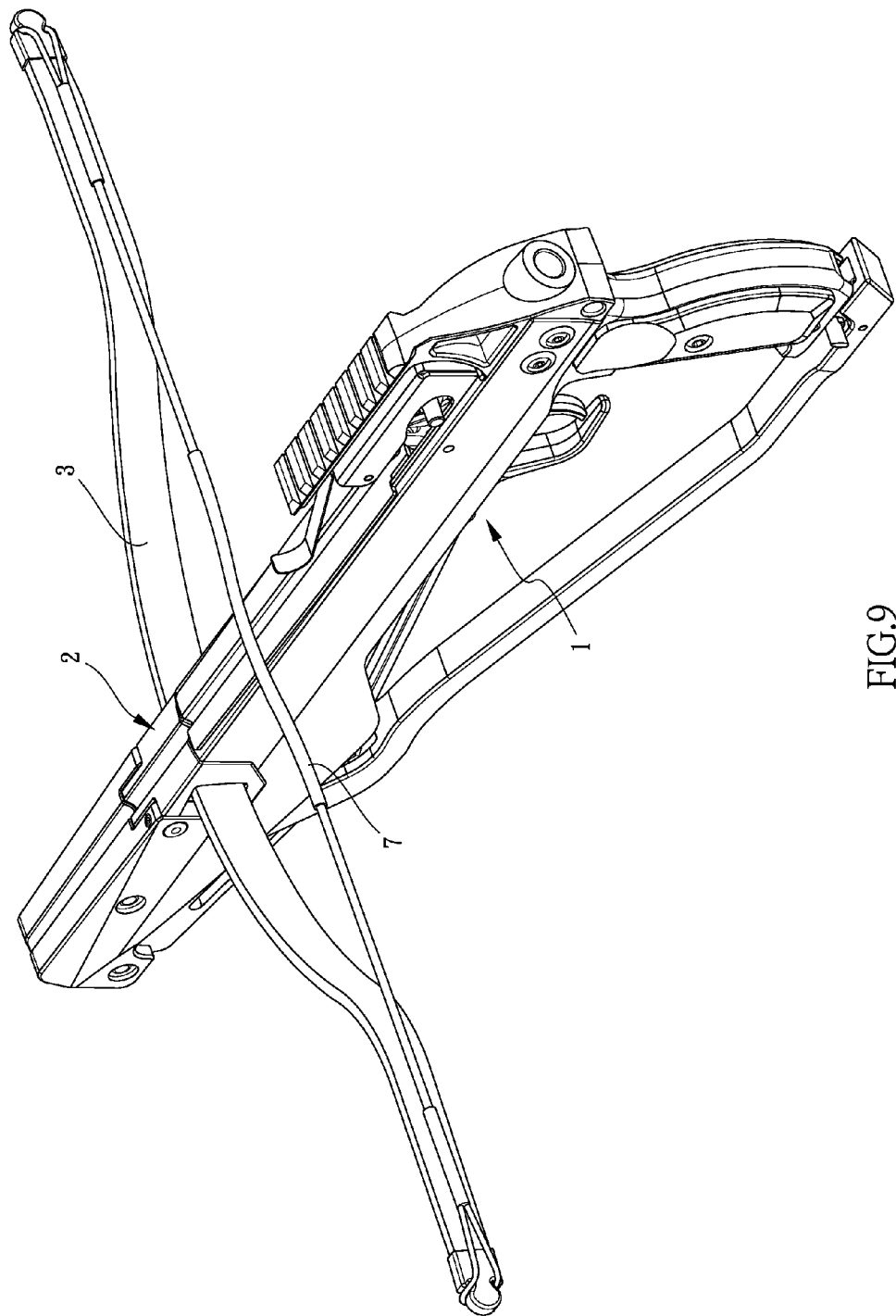
FIG. 9 shows that the fixing member is installed to another limb of different size.

When the users want to remove the fixing member 2 from the recess 13 of the barrel 1, the user pushes the distal end of the shank 52 toward the head 51 to remove the ball 63 from the first notch 522 to the second notch 523. Therefore, the pin 5 does not drop from the barrel 1 due to the ball 63 engaged with the second notch 523. On the contrary, when the users want to install the fixing member 2 to the recess 13 of the barrel 1, the user pushes the head 51 to allow the pin 5 to pass through the first hole 14 and the second hole 243. The ball 63 is removed from the second notch 523 to the first notch 522. Therefore, the pin 5 does not drop from the barrel 1 due to the ball 63 engaged with the first notch 522. The pin 5 does not drop during operation to install the fixing member 2 or to remove the fixing member 2 as shown in FIGS. 7 and 8.

The recess 13 has a curved face 131 and a first inclined face 132 defined in another inner end of the recess 13 and located close to the second end 12 of the barrel 1. The recess 13 has an engaging face 1331 and a inclined surface 1332 are defined in the inner end thereof which is located close to the first end of the barrel 1. The fixing member 2 has a curved face 22 and an inclined guiding face 23. The protrusion 24 has a contact face 241 and a second inclined face 242. The curved face 22 and an inclined guiding face 23 of the fixing member 2 are located corresponding to the curved face 131 and the first inclined face 132. The contact face 241 and the second inclined face 242 of the protrusion 24 are located corresponding to the engaging face 1331 and the inclined surface 1332 of the recess 13.

The curved face 22 of the fixing member 2 and the inclined guiding face 23 are located corresponding to the curved face 131 and the first inclined face 132 of the recess 13, so that when the user pulls the arrow (not shown), the force of the string 7 is distributed from the curved face 22 and the inclined guiding face 23 to the curved face 131 and the first inclined face 132, and the force continues to be distributed to the barrel 1. Therefore, the strength and stability of the crossbow are reinforced and enhanced. When the user pulls the trigger, the string 7 sends the arrow away. The bouncing force of the string is distributed from the contact face 241 and the second inclined face 242 to the engaging face 1331 and the inclined surface 1332, and the force continues to be distributed to the barrel 1. Therefore, the strength and stable feature of the crossbow are reinforced and enhanced when operating the crossbow.

Figure 6:
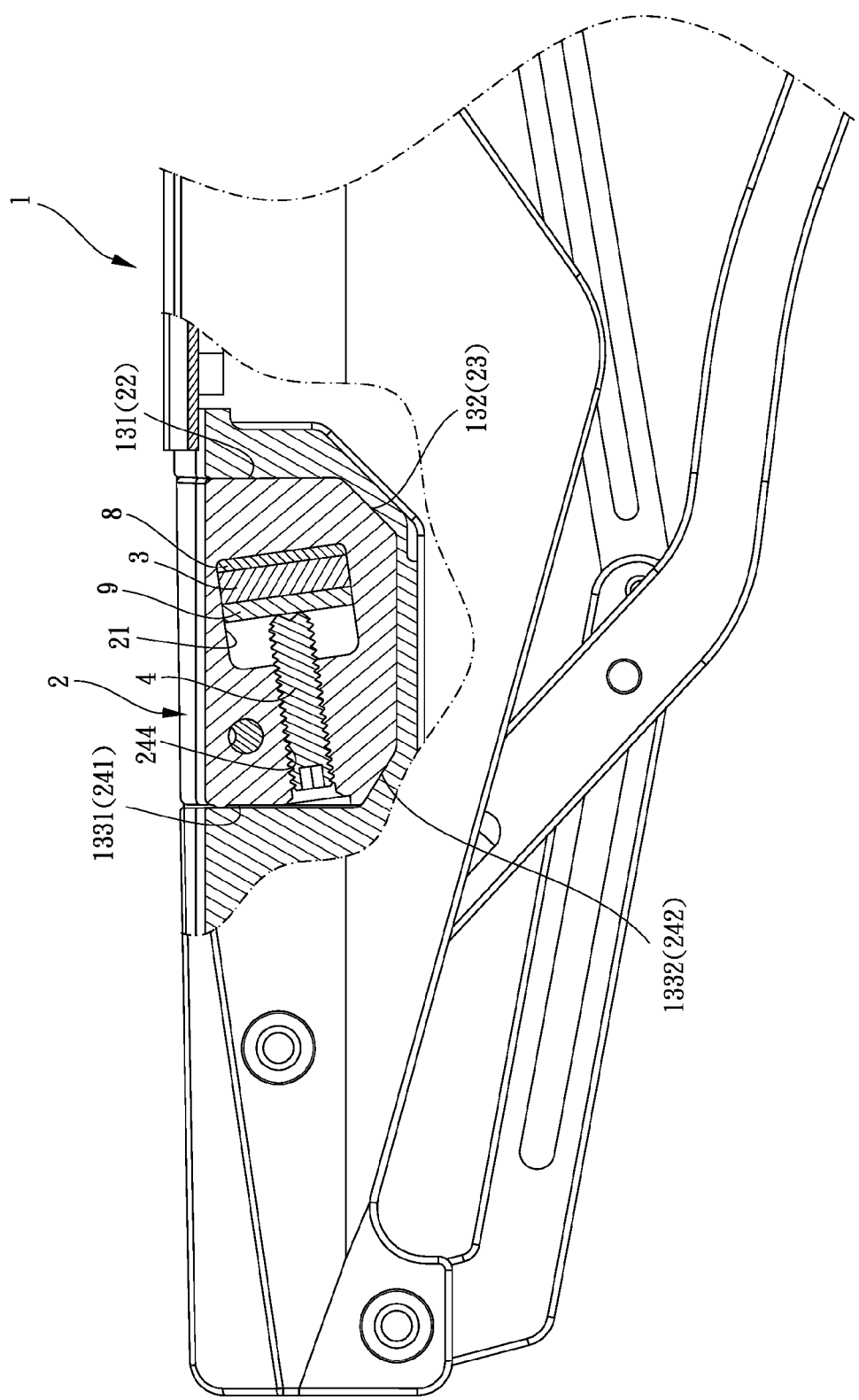
FIG. 6 is a cross sectional view, taken along line VI-VI in FIG. 3.

As shown in FIGS. 1 and 6, a first plate 8 and a second plate 9 are located in the reception hole 21 and the limb 3 is clamped between the first and second plates 8, 9. The fastener 4 is connected to the passage 244 and contacts against the second plate 9 in the reception hole 21. The second plate 9 pushes against the limb 3 and the first plate 8 to the inside of the reception hole 21 to fix the limb 3 to the reception hole 21 of the fixing member 2. As shown in FIG. 6, the reception hole 21 and the passage 244 tilt from the second inclined face 242 toward the curved face 22.

Figure 4:
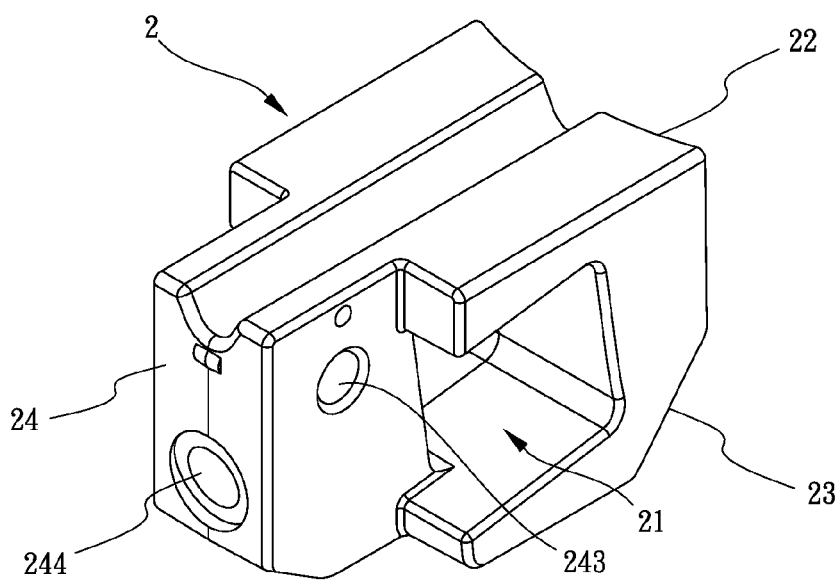
FIG. 4 is a perspective view to show the fixing member of the crossbow of the present invention.
Figure 5:
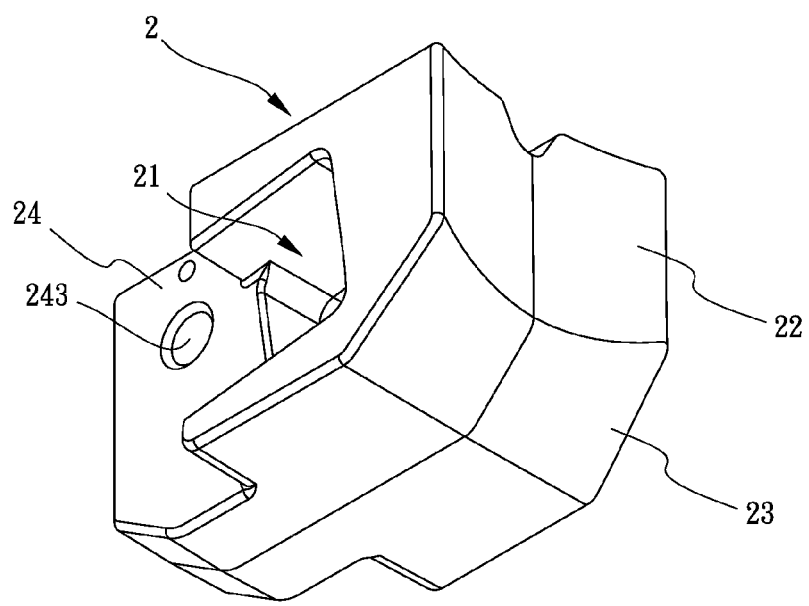
FIG. 5 shows another perspective view to show the fixing member of the crossbow of the present invention.

As shown in FIGS. 1, 4 and 5, the curved face 131 extends downward from an opening of the recess 13 and is connected to the first inclined face 132 which extends to an inner end of the recess 13. The engaging face 1331 extends downward from the opening of the recess 13 and is connected to the inclined surface 1332 which extends to the inner end of the recess 13. The curved face 22 extends downward from the top edge of the fixing member 2 and is connected to the inclined guiding face 23 and extends to the underside of the fixing member 2. The contact face 241 extends downward from the top edge of the of the fixing member 2 and is connected to the second inclined face 242 and extends to the underside of the fixing member 2.

While we have shown and described the embodiment in accordance with the present invention, it should be clear to those skilled in the art that further embodiments may be made without departing from the scope of the present invention.

What is claimed is:

1. A crossbow comprising:
a barrel having a first end and a second end, a recess defined in the barrel and located between the first and second ends, a receiving recess defined in one inner end of the recess and located close to the first end of the barrel;
a fixing member having a reception hole defined in one side thereof, a protrusion protruding from the fixing member and received in the receiving recess, a fastener extending through the protrusion and contacting a limb against an inside of the reception hole such that the limb is connected to the reception hole of the fixing member, the fixing member connected to the recess of the barrel, a pin extending through the barrel and the protrusion of the fixing member so as to restrict the fixing member from disengaging from the recess of the barrel, the pin having a head and a shank, the shank has a groove, a first notch and a second notch defined in an outside thereof, the first and second notches located on two ends of the groove, a positioning unit positioning the pin to the barrel, and
a string connected between the two ends of the limb.

2. The crossbow as claimed in claim 1, wherein the recess has a curved face and a first inclined face defined in another inner end of the recess and located close to the second end of the barrel, the recess has an engaging face and a inclined surface defined in an inner end thereof which is located close to the first end of the barrel, the fixing member has a curved face and an inclined guiding face, the protrusion has a contact face and a second inclined face, the curved face and an inclined guiding face of the fixing member are located corresponding to the curved face and the first inclined face, the contact face and the second inclined face of the protrusion are located corresponding to the engaging face and the inclined surface of the recess.

3. The crossbow as claimed in claim 2, wherein the receiving recess is located between two sidewalls and each sidewall has a first hole defined therethrough, a positioning hole is defined in one of the sidewalls and communicates with the first hole of the sidewall in which the positioning hole is defined, the protrusion has a second hole and a passage, the second hole is located corresponding to the first hole, the passage communicates with the reception hole, the fixing member is engaged with the recess of the barrel, the pin extends through the first hole and the second hole to restrict the fixing member from disengaging from the recess of the barrel, the positioning unit is connected to the positioning hole to fix the pin.

4. The crossbow as claimed in claim 1, wherein the receiving recess is located between two sidewalls and each sidewall has a first hole defined therethrough, a positioning hole is defined in one of the sidewalls and communicates with the first hole of the sidewall in which the positioning hole is defined, the protrusion has a second hole and a passage, the second hole is located corresponding to the first hole, the passage communicates with the reception hole, the fixing member is engaged with the recess of the barrel, the pin extends through the first hole and the second hole to restrict the fixing member from disengaging from the recess of the barrel, the positioning unit is connected to the positioning hole to fix the pin.

5. The crossbow as claimed in claim 1, wherein the positioning unit includes a bolt, a resilient member and a ball, the ball, the resilient member and the bolt are received in the positioning hole in sequence, the bolt is connected to the positioning hole to restrict the resilient member and the ball from disengaging from the positioning hole, the resilient member is biased between the ball and the bolt so that the ball is biased to be engaged with one of the first notch or the second notch.

6. The crossbow as claimed in claim 5, wherein a first plate and a second plate are located in the reception hole and the limb is clamped between the first and second plates, the fastener is connected to the passage and contacts against the second plate in the reception hole, the second plate pushes against the limb and the first plate to the inside of the reception hole to fix the limb to the reception hole of the fixing member.

7. The crossbow as claimed in claim 6, wherein the reception hole and the passage tilt from the second inclined face toward the curved face.

8. The crossbow as claimed in claim 7, wherein the curved face extends downward from an opening of the recess and is connected to the first inclined face which extends to an inner end of the recess, the engaging face extends downward from the opening of the recess and is connected to the inclined surface which extends to the inner end of the recess, the curved face extends downward from a top edge of the fixing member and is connected to the inclined guiding face and extends to an underside of the fixing member, the contact face extends downward from the top edge of the of the fixing member and is connected to the second inclined face and extends to the underside of the fixing member.

9. The crossbow as claimed in claim 2, wherein the curved face extends downward from an opening of the recess and is connected to the first inclined face which extends to an inner end of the recess, the engaging face extends downward from the opening of the recess and is connected to the inclined surface which extends to the inner end of the recess, the curved face extends downward from a top edge of the fixing member and is connected to the inclined guiding face and extends to an underside of the fixing member, the contact face extends downward from the top edge of the of the fixing member and is connected to the second inclined face and extends to the underside of the fixing member.

* * * * *